United States Patent
Levine

(10) Patent No.: US 11,078,946 B2
(45) Date of Patent: Aug. 3, 2021

(54) TOOLLESS SCREW TYPE FASTENER

(71) Applicant: Michael Levine, Phoenix, AZ (US)

(72) Inventor: Michael Levine, Phoenix, AZ (US)

(*) Notice: Subject to any disclaimer, the term of this patent is extended or adjusted under 35 U.S.C. 154(b) by 15 days.

(21) Appl. No.: 16/378,909

(22) Filed: Apr. 9, 2019

(65) Prior Publication Data
US 2019/0309783 A1 Oct. 10, 2019

Related U.S. Application Data

(60) Provisional application No. 62/654,739, filed on Apr. 9, 2018.

(51) Int. Cl.
*F16B 35/00* (2006.01)
*F16B 25/00* (2006.01)

(52) U.S. Cl.
CPC ...... *F16B 25/0026* (2013.01); *F16B 25/0068* (2013.01); *F16B 25/0084* (2013.01)

(58) Field of Classification Search
CPC .................................................. F16B 25/0068
USPC .................................................. 411/389, 412
See application file for complete search history.

(56) References Cited

U.S. PATENT DOCUMENTS

| | | | | |
|---|---|---|---|---|
| 1,018,490 A * | 2/1912 | Hall | ...................... | E04B 1/4121 52/701 |
| 1,697,810 A * | 1/1929 | Comstock | ............... | F16B 15/00 411/487 |
| 3,861,269 A * | 1/1975 | Laverty | ............... | F16B 25/0047 411/413 |
| 5,160,225 A * | 11/1992 | Chern | ................... | F16B 13/002 408/203.5 |
| 5,669,592 A * | 9/1997 | Kearful | .................. | F16M 11/14 248/217.4 |
| 5,944,295 A * | 8/1999 | McSherry | ............. | F16B 25/103 248/304 |
| 7,290,972 B2 * | 11/2007 | Gauthier | ............... | F16B 13/002 411/107 |
| 8,057,147 B2 * | 11/2011 | Ernst | ..................... | F16B 13/002 411/387.1 |
| 2005/0031434 A1 * | 2/2005 | Gaudron | ................. | F16B 25/00 411/412 |
| 2007/0183866 A1 * | 8/2007 | Gallien | ................... | F16B 45/00 411/401 |
| 2007/0224013 A1 * | 9/2007 | Panasik | ................. | F16B 13/002 411/30 |
| 2008/0080953 A1 * | 4/2008 | Wu | ..................... | F16B 25/0068 411/412 |
| 2009/0269164 A1 * | 10/2009 | Gonciarz | ............ | F16B 25/0078 411/416 |

(Continued)

*Primary Examiner* — Gary W Estremsky
(74) *Attorney, Agent, or Firm* — Millen, White, Zelano & Branigan, PC; Ryan Pool

(57) ABSTRACT

The invention is directed to a toolless screw including a body portion which comprises a shaft portion and a screw portion which includes a shank portion and a tip portion. The shank portion includes at least two helical threads which extend off the shank either at different angles, different distances, or a combination thereof. The tip portion is positioned at an end of the shank portion and has a diameter which is less than the diameter of the shank portion and extends to a point. The body portion is integrated with a screw portion at the end of the shank portion which is opposite the end where the tip portion is positioned.

15 Claims, 7 Drawing Sheets

(56) References Cited

U.S. PATENT DOCUMENTS

2010/0003100 A1\* 1/2010 Ernst ................... F16B 35/048
411/30
2010/0221086 A1\* 9/2010 Pippard .............. F16B 25/0057
411/387.3

\* cited by examiner

TOOLLESS SCREW TYPE FASTENER

BACKGROUND

Screws are well known simple machines which are used as fastening devices. Screws of the prior art use various tools for the creation of additional leverage to allow a user to screw in the fastener to the material of choice. Additionally, many screws require predrilled holes to further reduce the force required to install the screw.

In addition, when drywall screws are driven too far, they break the surface of the paper face of the wallboard. Once the paper face is broken much of the holding power of the screw or nail is lost. The paper is an important part of the drywall structure. It is a common occurrence that users applying drywall screws or nails go too far and puncture the paper. Plaster and paper function similarly to concrete and rebar in that the plaster based core of the drywall resists compression and the paper resists tension.

U.S. Pat. No. 7,040,850 discloses a screw having multiple helical diameters for its treads. This patent also discloses a second thread to prevent the upper portion of the shank proximate head from being bent. The invention in this patent is specifically designed to be used with a tool, i.e., a screw driver. It also requires many turns to fully install, as seen from the number of helical runs of the screw portion. All of these factors result in doing significant damage to the dry wall where it is attached.

U.S. Pat. No. 6,419,436 discloses tapering the diameter of its screw threads. Again, the invention in this patent is specifically designed to be used with a tool, i.e., a screw driver. The invention includes wide helical treads which extend all the way down the screw. All of these factors result in doing significant damage to the dry wall where it is attached.

The need for tools adds both complexity and the need for the user to possess the skill required to utilize the tool. It also adds cost to the installation cost as one needs to acquire both the screw and a separate tool to install the screw. Additionally, the use of the tool increases the chances that damage will be done to the dry wall material by, for example, over rotating the screw.

Some prior art embodiments include built in tools. For example, U.S. Pat. No. 4,856,953 includes a non-standard screw head receiver shape. This receiver in the screw head is designed to accept a hook which serves the dual purpose of acting as a hook and increasing the leverage of a user when installing the screw. This invention uses a hook tool instead of the standard screw driver with the same purpose and effect. In another example, U.S. Pat. No. 8,286,928 teaches a hook integrated into the body of the screw in a shape which acts as an offset levering handle to increase the leverage of a user when installing the screw. U.S. Pat. No. 8,286,928 is also not suitable for friable wall materials, only wood.

The prior art thus teaches that screws must either have a receiver for a separate tool to allow for installation or must shape the handle in an offset levering manner to for increased leverage for the user. All of these designs intentionally create added torque on the device which increases the probability of over rotation and damage to the material into which the screw is being installed.

There is therefore a need for an easy to install toolless screw, suitable for installation into friable wall materials which causes minimal damage to the friable wall materials.

SUMMARY OF THE INVENTION

The invention described herein is a toolless Drywall Screw Peg "DSP" which addresses the problem of attaching a suitably strong peg to a weak friable gypsum material like typical residential drywall without the use of any tools. The device of the invention achieves attachment with a puncture and a few twists of the wrist and is useful for, as an example, hanging jewelry, cords, art, objects wherever the user desires, without mollies, anchors, butterflies, a hammer, screwdriver or drill. The invention of the current application does minimal damage to the drywall including the paper, the friable gypsum, and optionally paint.

Many of the preferred embodiments described in the current application are preferred because they do even less damage to the drywall which results in better performance of the device. In some embodiments of the invention, structure of the screw prevents the user from over tightening or overly destroying the drywall material.

The invention includes a device with a screw portion and body portion.

The screw portion includes a shank and a tip portion. The shank portion includes at least two helical threads. The threads circle the circumference of the shank portion. In some embodiments the shank portion includes roughened surface between successive convolutions of helical thread. In some embodiments, the helical treads extend off the shank portion at a 10 degree angle. In some embodiments, the helical treads extend off the shank portion at an angle of between 5 and 15 degrees.

In some embodiments the helical threads of the screw from 4 to 5 turns and preferably 2 to 3 turns. Reducing the total turns required to secure the screw fully to the wall reduces the likelihood of the screw reaming out the friable gypsum which makes up most drywall.

In some embodiments, the length of the shank and tip portion of the screw is less than the thickness of the dry wall, i.e., less than ⅜ inch or less than ½ inch. A short screw length also provides the advantage of giving the user a shorter target to get the peg in the desired location. This means the screw is easier for a user to operate.

In some embodiments each rotation of each helical thread extends less than 1 inch down the shank portion. In some embodiments the distance between the first helical thread and the second helical thread on the upper part of the shank portion where both are present is half the distance of one complete helical turn. In some embodiments, the upper part of the shank portion is defined as the top 25% of the shank portion. In some embodiments the upper part of the shank portion is defined as the top 50% of the shank portion. In some embodiments the upper part of the shank portion is defined as the top 10% of the shank portion. In some embodiments, the first helical thread and the second helical thread are both present on only the upper part of the shank portion.

In some embodiments, the first helical thread extends the full length of the skank portion and optionally at least a portion of the tip portion. In some embodiments, the first helical thread does not extend into the tip portion. In some embodiments, the first helical thread extends 75% of the shank portion beginning at the top of the shank portion where the screw portion meets the body portion.

The second helical thread is positioned only in the upper part of the shank portion. In some embodiments the second helical thread extends only two full rotations of the circumference of the shank portion. In some embodiments the second helical thread extends only one full rotation of the circumference of the shank portion. In some embodiments the second helical thread extends only one and a half full rotations of the circumference of the shank portion. In some embodiments the second helical thread extends between one half and two full rotations of the circumference of the shank portion. In some embodiments the second helical thread extends between one half and four full rotations of the circumference of the shank portion.

In some embodiments the second helical thread extends only half the length of the shank portion. In some embodiments the second helical thread extends only a third the length of the shank portion. In some embodiments the second helical thread extends only a quarter the length of the shank portion. In some embodiments the second helical thread extends only a fifth of the length of the shank portion. In some embodiments the second helical thread extends between one tenth and two thirds the length of the shank portion. In some embodiments the second helical thread extends between one tenth and one half the length of the shank portion. In some embodiments the second helical thread extends between one tenth and one quarter the length of the shank portion.

The tip of the screw portion is defined as a section in which the shank portion begins to have a reduced diameter and extending to end in a point.

In some embodiments, the screw tip may be from 1/8" to 5/8" and preferably 2/8" to 4/8" and more preferably about 3/8" to allow the screw tip to break through the strength and elasticity of, for example, paint and the paper of the drywall in a typical residential dwelling. In the preferred embodiments, there are no screw threads in the screw tip portion.

The body portion of the invention includes a shaft portion, an optional support portion, and an optional adapter portion. The screw portion is integrated into the body portion where the upper part of the screw portion meets the lower part of the body portion. In some embodiments, the upper part of the screw portion is welded onto the body portion where the upper part of the screw portion meets the lower part of the body portion. In some embodiments, a portion of the upper part of the screw portion extends inside the body portion. The body portion has a circumference that is greater than the circumference of screw portion. In some embodiments, the body portion has a greater length than diameter.

The body portion can generally have any shape. In some embodiments the body has the shape of a regular polygon, for example, a cylinder, triangle, square, hexagon, octagon, pentagon, star shape etc. In some embodiments the body has the shape of an irregular polygon.

In some embodiments the body includes a support portion. The support portion is positioned at the bottom most part of the body portion where the screw portion is integrated into the body portion. The support portion has a greater diameter than the body portion. Once the screw is installed the support portion will be positioned to contact the surface to which the screw is installed in, for example, dry wall. The support portion functions to increase the weight which the body portion can support by increasing the surface area in contact with, for example, the wall on which the screw is installed.

In some embodiments the body portion is capable of holding up to 60 pounds when installed into dry wall or other friable material. In some embodiments the screw requires 3-5 foot pounds of torque to be applied to enable installation.

In some embodiments the body includes an adapter portion. The adapter portion is provided on the upper end of the body, opposite the screw portion. The adapter portion allows for the optional removable attachment of objects. In some embodiments the adapter portion is a connecter, for example a treaded screw or a treaded bolt. In some embodiments the adapter portion is the male end and the object is the female end wherein the two are attached via friction fit. In some embodiments the adapter portion is either the hook or loop portion of a hook and loop fastener. In some embodiments the adapter portion includes an adhesive for attachment purposes.

In some embodiments, the adapter portion is continuous with the body portion. In such embodiments the adapter portion extends to form a shape which is different from the body portion such as a hook or a handle or a t-shape.

In some embodiments, the adapter portion is from $1/16^{th}$ to 2 times the length of the shaft portion of the body portion. In the preferred embodiments, the adapter portion is from $1/12^{th}$ to the same length of the shaft portion of the body portion. In the more preferred embodiments, the adapter portion is from $1/8^{th}$ to 1/2 the length of the shaft portion of the body portion, for example, 1/6, 1/4, or 1/3.

In some embodiments, the screw portion and body portion are the same continuous structure. This also could include embodiments where a separate screw portion and body portion are joined or bound in some permanent or semi-permanent way such as welding or strong adhesive binding. In such cases the screw portion and body portion function as the same structure after being joined.

In some embodiments, the diameter of the shaft portion of the body portion can be as small as 1/8" in diameter and function to hold up to 1 lb. As the diameter of the shaft portion increases the load capacity increases. In some embodiments, the diameter of the shaft portion is from 1/8" to 2". In the preferred embodiments, the diameter of the shaft portion is from 1/4" to 3/4". In the more preferred embodiments the diameter of the shaft portion is from 3/8" to 5/8", for example, 0.44 inches. In tested examples, 1/2" to 1" yielded 15 to 30 lbs of capacity at the connection, respectively. An advantage of the invention is to provide for minimal use of force for piercing the drywall using only a user's hand, for example, under 5 pounds of pressure. Once inside the gypsum/drywall, the helical sharp edge with axial rotation, i.e., screw driver motion, allows the device to corkscrews itself with hardly any force into the wall.

The length of the shaft portion can be from 0.25 inches to 12 inches in length. In the preferred embodiments the shaft portion is from 0.25 inches to 6 inches, for example, 0.5 inches, 1 inch, 2 inches, 3 inches, 4 inches, 5 inches, 6 inches.

The selected diameter of the shaft portion may also be chosen in consideration of user comfort. That is, a shaft portion intended for use by a child may have a different diameter than one intended for an adult. The shaft portion can be made of any suitably still material, for example, steel, plastic, rubber, or wood. The device can also combine materials.

In some embodiments the body portion also has a support portion. The support portion is positioned on the screw side of the body portion. In the preferred embodiments, the support portion is at least the same diameter as the shaft portion. In the more preferred embodiments, the support portion has a greater diameter than the shaft portion.

In some embodiments, the support portion has a frusto-conical shape where the smaller diameter end is positioned toward the shaft portion and the larger diameter end is positioned toward the screw end of the body portion. In some embodiments, the diameter changes from equal to the diameter of the shaft portion to 1× to 10× the diameter of the shaft portion, where "×" means times as large. In more preferred embodiments, the diameter of the larger end is not so much greater than the shaft portion, for example, 5×, 4×, 3×, 2×, 1.75×, 1.5×, or 1.25×.

The length of the support portion is from 0.01× to 10× the length of the shaft portion. In the preferred embodiment, the length of the support portion is less than the length of the shaft portion. In the more preferred embodiments the length of the support portion is from 0.01× to 0.5× the length of the shaft portion. In the more preferred embodiments, the length of the support portion is from 0.05× to 0.2× the length of the shaft portion.

As the diameter of the support portion increases the shaft portion capacity increases as well. The actual amount of this increase varies depending on the total length of the body portion and where force of weight is applied.

DETAILED DESCRIPTION OF THE DRAWINGS

Figure 1:
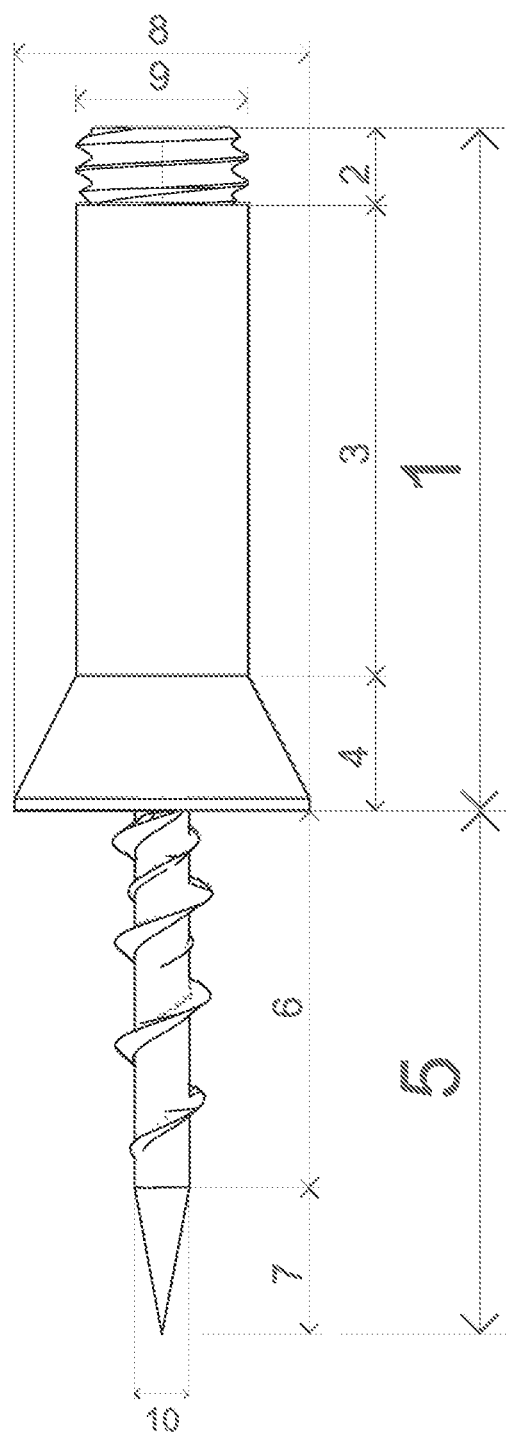
FIG. 1 is a side view of an embodiment of the invention including a screw portion with a shank and a tip portion and a body portion with a shaft portion, a support portion, and an adaptor portion.

FIG. 1 shows a side view of an embodiment of the invention including a screw portion 5 with a shank 6 and a tip portion 7 and a body portion 1 with an adapter portion 2, a shaft portion 3 and a support portion 4.

In the illustrated embodiment of FIG. 1, the largest diameter 8 is that of the support portion 4 which is, for example, 0.75 inches. The diameter 9 of the body portion 1 is, for example, 0.44 inches. The diameter 10 of the tip region is, for example, 0.138 inches. The length of the body portion 1 is, for example, 1.75 inches where the adapter portion 2 is, for example, 0.2 inches, the shaft portion 3 is, for example, 1.21 inches, and the support portion 4 is, for example, 0.34 inches. The a screw portion 5 has a length, for example, of 1.34 inches, with the shank 6 being, for example, 0.973 inches, and the tip portion 7 having a length of 0.375 inches.

Figure 2:
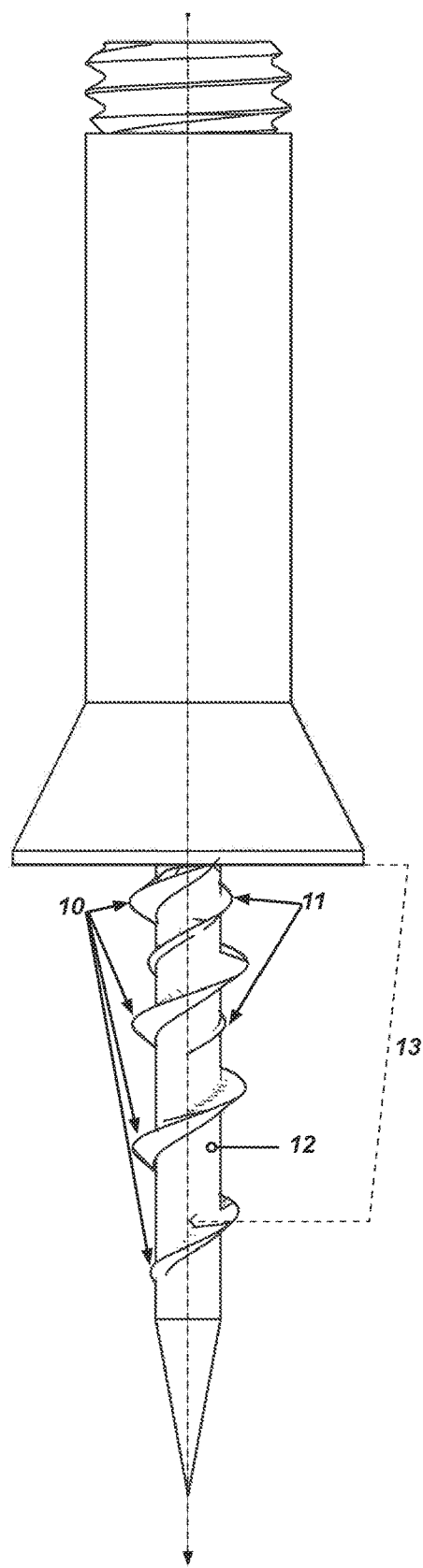
FIG. 2 is another side view of an embodiment like that of FIG. 1 but includes labels for additional features.

FIG. 2 is another side view of an embodiment like that of FIG. 1 but includes labels for the first helical thread 10, the second helical thread 11, and a roughened surface 12 of shank portion 6. As seen in the figure, the first helical thread 10 extends further down the shank portion 6 than the second helical thread 11 and both helical threads are only present together in the top portion of the shank. Additionally, FIG. 2 illustrates that in some embodiments the shank portion 6 has a roughened surface 12. This roughened surface is optionally present in all regions between successive convolutions of either or both of the helical threads 10 and/or 11.

FIG. 2 also illustrates that, in some embodiments, the shank portion 6 may taper in diameter towards a tip portion direction. For example, the diameter of the of the shank portion 6 in the upper most part of the shank portion 6 compared to the diameter of the of the shank portion 6 in the portion of the shank portion 6 closest to the tip portion 7 can be, from 1:1 to 2:1 and preferably 1.5:1.

Figure 3:
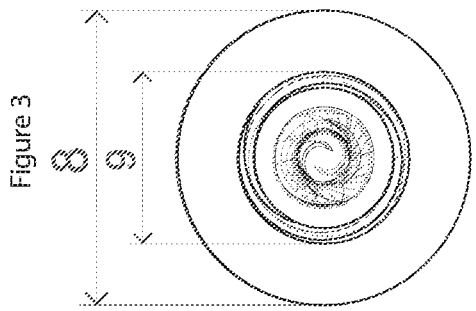
FIG. 3 is a top view looking down at the tip portion of an embodiment of the invention.

FIG. 3 illustrates a top view looking down at the tip portion 7. FIG. 3 shows the perspective diameters of, for example, the diameter 8 is that of the support portion 4 and the diameter 9 of the body portion 1.

Figure 4:
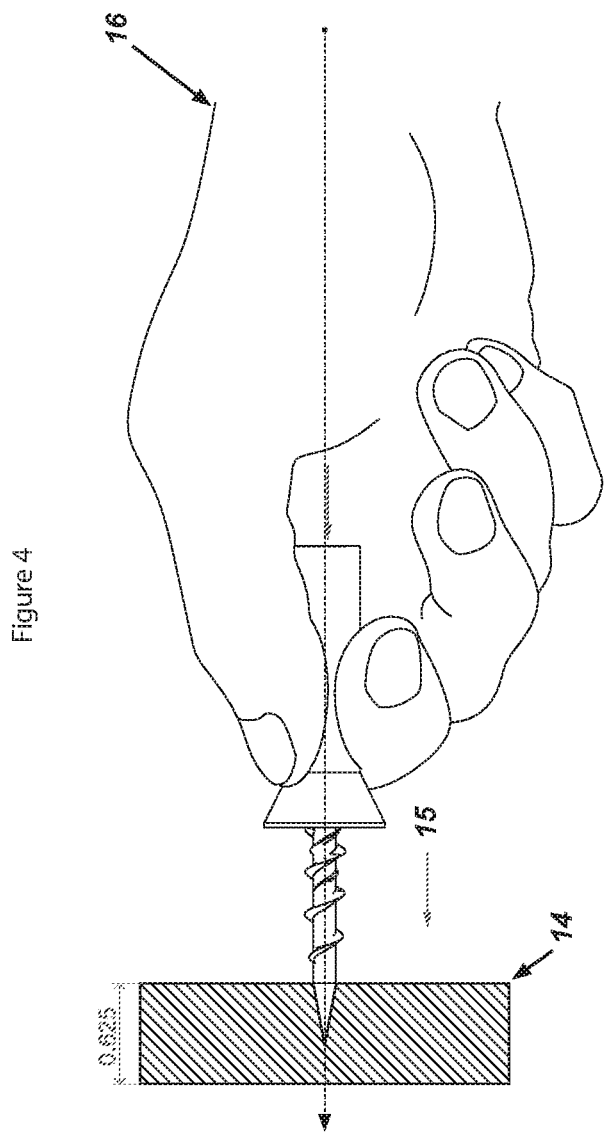
FIG. 4 is depicts a first step in installing the device in a drywall.

FIG. 4 illustrates a first step in installing the device in a drywall. FIG. 4 shows a user 16, beginning to install a device of the current invention into an object 14, for example, a dry wall. Force is applied by the user in a direction 15 toward the object 14. This allows the tip portion 7 to stab into the object 14.

Figure 5:
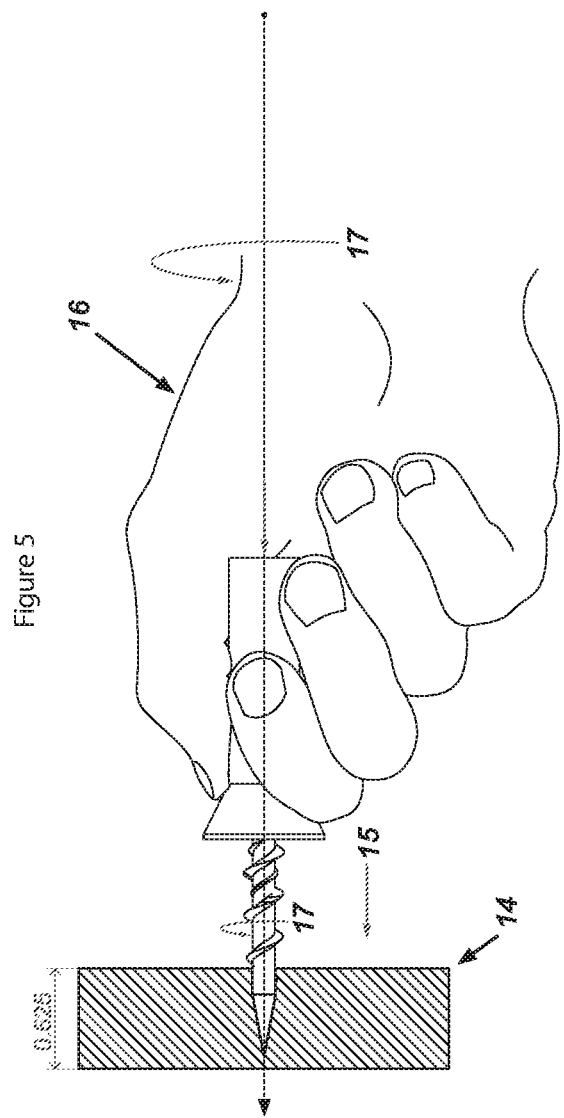
FIG. 5 depicts a second step in installing the device in a drywall.

FIG. 5 depicts a second step in installing the device in a drywall. In FIG. 5, the user 16 rotates 17 the device in, for example, a clock-wise direction while maintaining force in a direction 15 toward the object 14.

Figure 6:
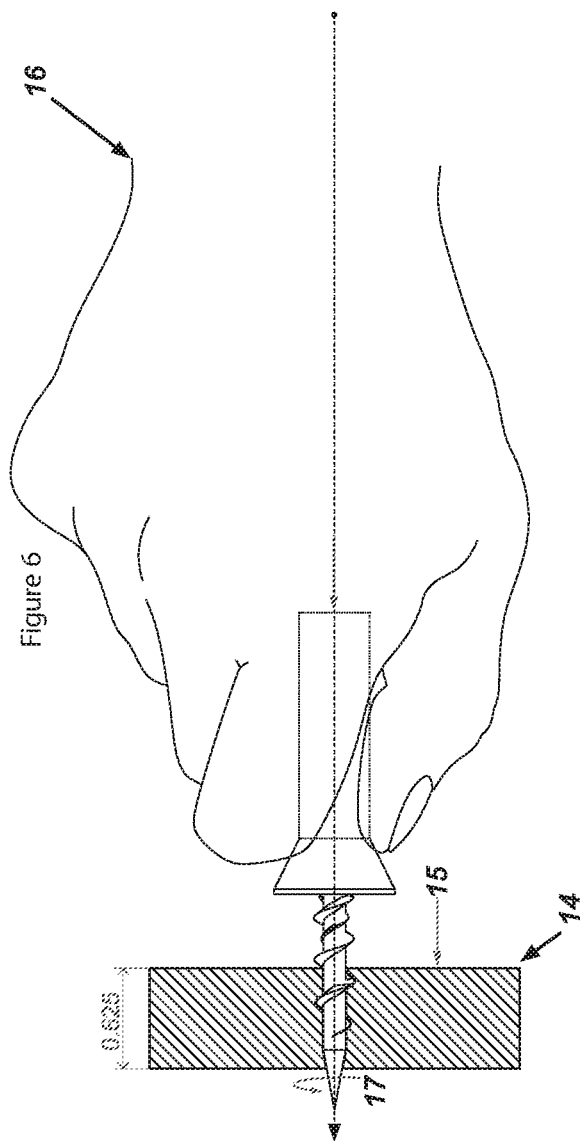
FIG. 6 depicts a third step in installing the device in a drywall.

FIG. 6 depicts a third step in installing the device in a drywall. In FIG. 6, the first helical thread 10 is within the object 14. The user 16 continues to rotate 17 the device in, for example, a clock-wise direction while maintaining force in a direction 15 toward the object 14. The device is now traveling thought the object 14 in a screw motion not a stabbing or nail like motion. This causes minimal damage to the object 14 because areas between the first helical thread 10 are not damaged.

Figure 7:
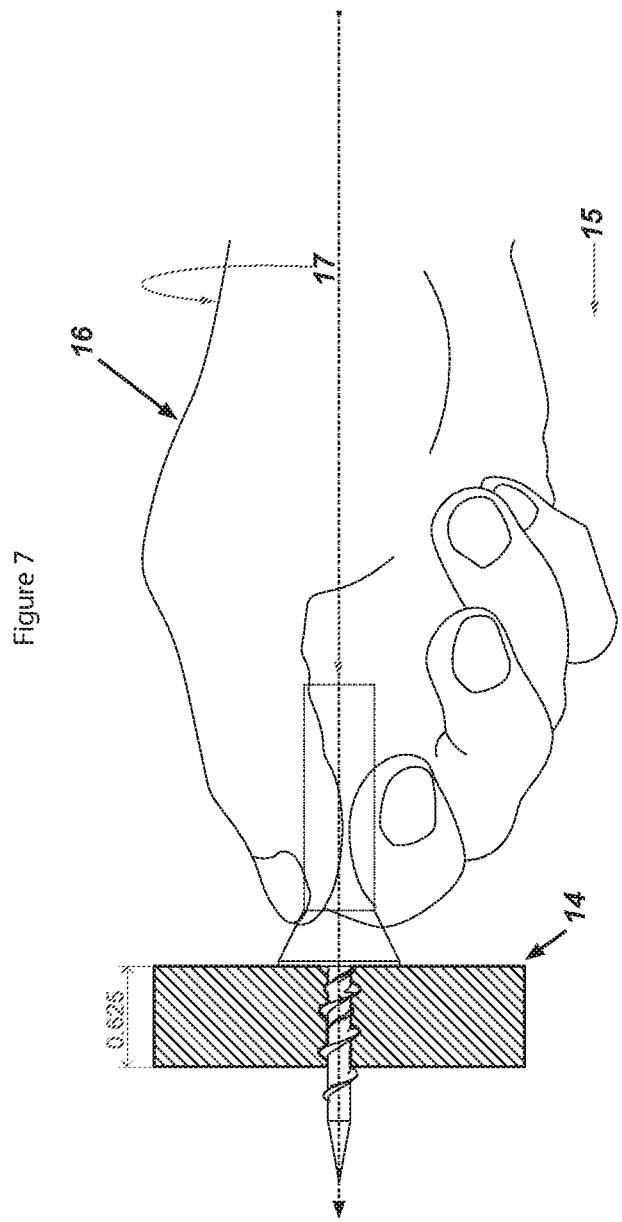
FIG. 7 depicts a forth step in installing the device in a drywall.

FIG. 7 depicts a forth step in installing the device in a drywall. In FIG. 7, the device is fully installed in the object 14. The second helical thread 11 is also within the object 14. The user 16 has rotated 17 the device in, for example, a clock-wise direction while maintaining force in a direction 15 toward the object 14 until the support portion 4 is abutting the object 4.

The invention claimed is:

1. A toolless screw comprising:
(A) a body portion which consists of a shaft portion, an optional support portion, and an optional adapter portion,
(B) a screw portion which comprises a shank portion and a tip portion,
wherein said shaft portion consists of a continuous, voidless, and generally cylindrical polygon and has a length from 0.25 inches to 12 inches,
wherein said shank portion consists of a generally cylindrical portion with two or more threads which extend off the shank either at different angles, different distances, or a combination thereof,
said tip portion consists of a frustoconical threadless area which extends to a point and is positioned at a first end of the shank portion,
wherein the body portion is integrated with the screw portion at a second end of the shank portion which is opposite the first end where the tip portion is positioned,
wherein the optional adapter portion consists of a continuous, voidless, and generally cylindrical threaded bolt and is provided on the upper end of the body, opposite the screw portion, and
wherein the optional support portion has a frustoconical shape where the smaller diameter end is positioned toward the shaft portion and the larger diameter end is positioned toward the screw portion end of the body portion.

2. The toolless screw of claim 1 wherein the support portion is present.

3. The toolless screw of claim 2 wherein the diameter of the larger end of the support portion is from 1.25 times to 1.75 times the diameter of the smaller end of the support portion.

4. The toolless screw of claim 2 wherein the length of the support portion is from 0.05 to 0.2 times the length of the shaft portion.

5. The toolless screw of claim 1 wherein the shaft portion has a diameter of 3/8" to 5/8" and a length of 0.25 inches to 6 inches.

6. The toolless screw of claim 1 wherein the adapter portion is present.

7. The toolless screw of claim 1 wherein the at least two helical threads extend off the shank portion at an angle of between 5 and 15 degrees.

8. The toolless screw of claim 1 wherein the second helical thread is present only in the top half of the shank portion and the first helical thread is present in more than the top half of the shank portion.

9. The toolless screw of claim 8 wherein first helical thread is present only in the top 75% of the shank portion.

10. The toolless screw of claim 1 wherein the body portion has a greater length than diameter.

11. A toolless screw comprising:
(A) a body portion which consists of a shaft portion,
(B) a screw portion which comprises a shank portion and a tip portion,
wherein said shaft portion consists of a continuous, voidless, and generally cylindrical polygon and has a length from 0.25 inches to 12 inches, and a diameter of at least 1/8 of an inch,
wherein said shank portion includes at least two helical threads which extend off the shank either at different angles, different distances, or a combination thereof,
said tip portion is positioned at an end of the shank portion and has a diameter which is less than the diameter of the shank portion and extends to a point,
wherein the body portion is integrated with the screw portion at the end of the shank portion which is opposite the end where the tip portion is positioned, and
wherein the shank portion has a roughened surface between successive convolutions of helical thread.

12. A toolless screw consisting of:
(A) a body portion which consists of a shaft portion, optionally a support portion, and optionally an adapter portion,
(B) a screw portion which consists of a shank portion and a tip portion,
wherein said shaft portion consists of a continuous, voidless, and generally cylindrical polygon and has a length from 0.25 inches to 12 inches, and a diameter of at least 1/8 of an inch,
wherein said shank portion consists of a generally cylindrical portion with two threads which extend off the shank either at different angles, different distances, or a combination thereof,
wherein said tip portion consists of a frustoconical threadless area which extends to a point and is positioned at a first end of the shank portion,
wherein said body portion is integrated with the screw portion at a second end of the shank portion which is opposite the first end of the shank portion and a second end of the shaft portion which is opposite a first end of the shaft portion,
wherein the optional adapter portion consists of a continuous, voidless, and generally cylindrical threaded bolt and is provided on the upper end of the body, opposite the screw portion, and
wherein the optional support portion has a frustoconical shape where the smaller diameter end is positioned toward the shaft portion and the larger diameter end is positioned toward the screw portion end of the body portion.

13. The toolless screw of claim 12 wherein said adapter portion is present.

14. The toolless screw of claim 12 wherein said support portion is present.

15. The toolless screw of claim 14 wherein said adapter portion is present.

* * * * *